United States Patent
Laddu et al.

(10) Patent No.: US 12,324,024 B2
(45) Date of Patent: Jun. 3, 2025

(54) PRIORITY FOR THE POWER ALLOCATION FOR PRACH TRANSMISSION FOR TA ACQUISITION

(71) Applicant: Nokia Technologies Oy, Espoo (FI)

(72) Inventors: Keeth Saliya Jayasinghe Laddu, Espoo (FI); Timo Koskela, Oulu (FI); Sanjay Goyal, Denville, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/925,156

(22) Filed: Oct. 24, 2024

(65) Prior Publication Data

US 2025/0048446 A1 Feb. 6, 2025

Related U.S. Application Data

(63) Continuation of application No. PCT/IB2024/053248, filed on Apr. 3, 2024.

(60) Provisional application No. 63/459,320, filed on Apr. 14, 2023.

(51) Int. Cl.
*H04W 74/0833* (2024.01)
*H04W 52/14* (2009.01)

(52) U.S. Cl.
CPC ..... *H04W 74/0833* (2013.01); *H04W 52/146* (2013.01)

(58) Field of Classification Search
CPC . H04W 72/0446; H04W 92/10; H04W 52/00; H04W 74/0833; H04W 74/00
See application file for complete search history.

(56) References Cited

U.S. PATENT DOCUMENTS

| | | | |
|---|---|---|---|
| 2015/0208404 A1 | 7/2015 | Yie et al. | |
| 2022/0225435 A1 | 7/2022 | Chen et al. | |
| 2022/0279453 A1* | 9/2022 | Dinan | H04W 52/362 |
| 2023/0112574 A1 | 4/2023 | Tseng et al. | |
| 2024/0147328 A1* | 5/2024 | Kim | H04W 36/08 |

FOREIGN PATENT DOCUMENTS

EP 3806345 A1 4/2021

* cited by examiner

*Primary Examiner* — Tu X Nguyen
(74) *Attorney, Agent, or Firm* — McCarter & English, LLP

(57) ABSTRACT

Embodiments of the present disclosure disclose devices, methods and apparatuses for power allocation for PRACH transmission. An apparatus comprising at least one processor, and at least one memory storing instructions that, when executed by the at least one processor, cause the apparatus at least to: determine a power allocation priority for an uplink transmission, based at least on determining at least one of: the uplink transmission is associated with a cell configured for layer 1 or layer 2 triggered mobility, or the uplink transmission is not associated with a serving cell; and perform the uplink transmission based on the determined power allocation priority for the uplink transmission, wherein the uplink transmission comprises at least one of a physical random access channel transmission or a sounding reference signal transmission.

20 Claims, 6 Drawing Sheets

PRIORITY FOR THE POWER ALLOCATION FOR PRACH TRANSMISSION FOR TA ACQUISITION

CROSS REFERENCE TO RELATED APPLICATION

This patent application is a continuation of International Patent Application Number PCT/IB2024/053248 filed Apr. 3, 2024, which claims priority to Provisional Application U.S. 63/459,320, filed on Apr. 14, 2023, which is hereby incorporated by reference in its entirety.

This application claims priority from PCT Application No. PCT/IB2024/053248, filed on Apr. 3, 2024, which claims priority from U.S. provisional Application No. 63/459,320, filed on Apr. 14, 2023.

TECHNICAL FIELD

The examples and non-limiting example embodiments relate generally to communications and, more particularly, to priority for the power allocation for PRACH transmission for TA acquisition.

BACKGROUND

It is known to manage power consumption of a network node in a communication network.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
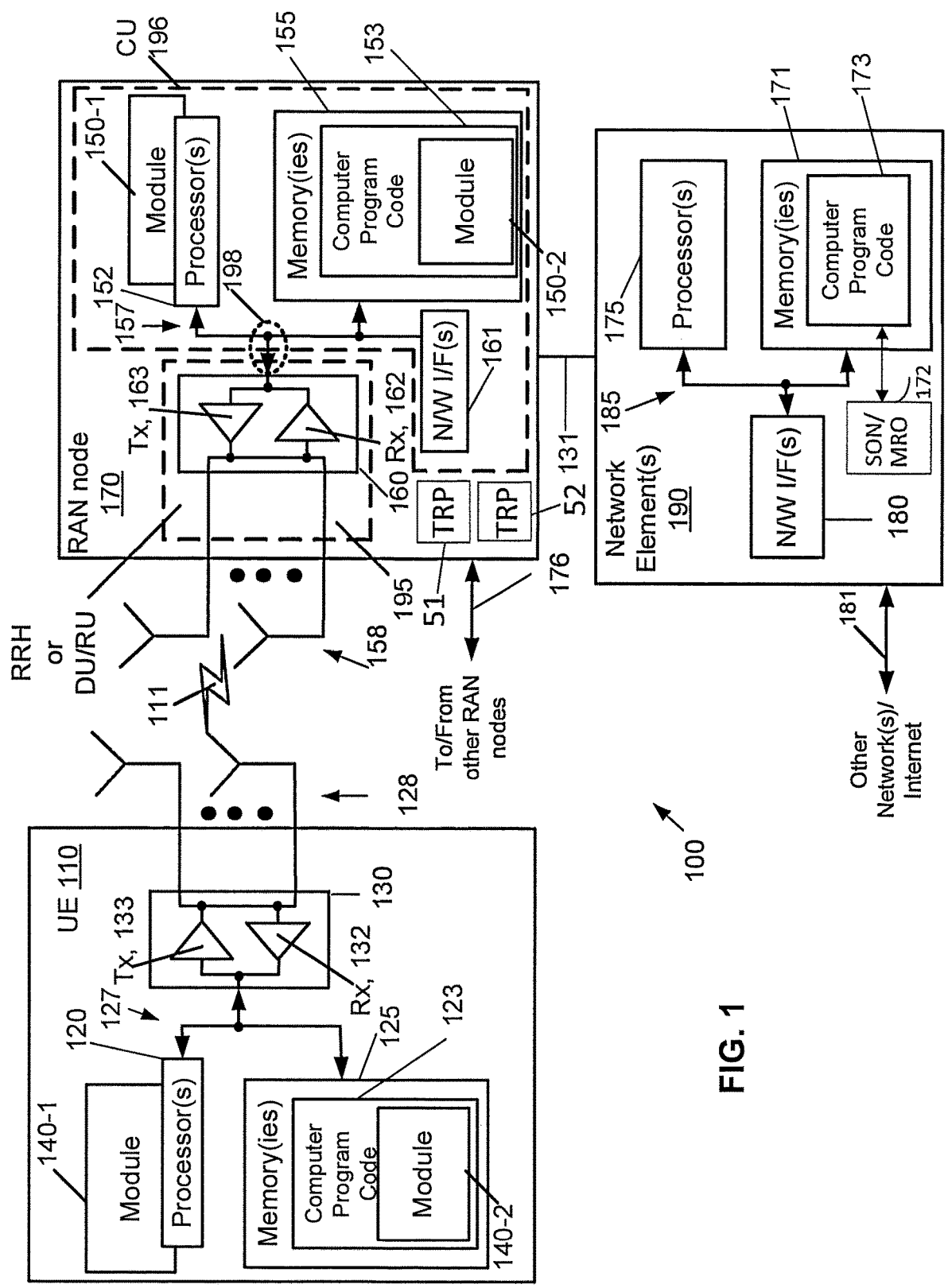
FIG. 1 is a block diagram of one possible and non-limiting system in which the example embodiments may be practiced.

Turning to FIG. 1, this figure shows a block diagram of one possible and non-limiting example in which embodiments of the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including priority for the power allocation for PRACH transmission for TA acquisition. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

The examples described herein relate to the 3GPP RAN1 work item for lower layer triggered mobility. The background of the examples described herein include random access preamble transmission in a random access procedure and carrier aggregation.

L1/L2 Triggered Mobility (LTM)

LTM denoted also as L1/2 inter-cell mobility, is one of the objectives for mobility enhancement in the Rel. 18 work item. In LTM, the decision about the cell change is based on L1 measurements and is made in the MAC layer in the distributed unit (DU). Lower layer mobility and LTM are used interchangeably herein.

Figure 2:
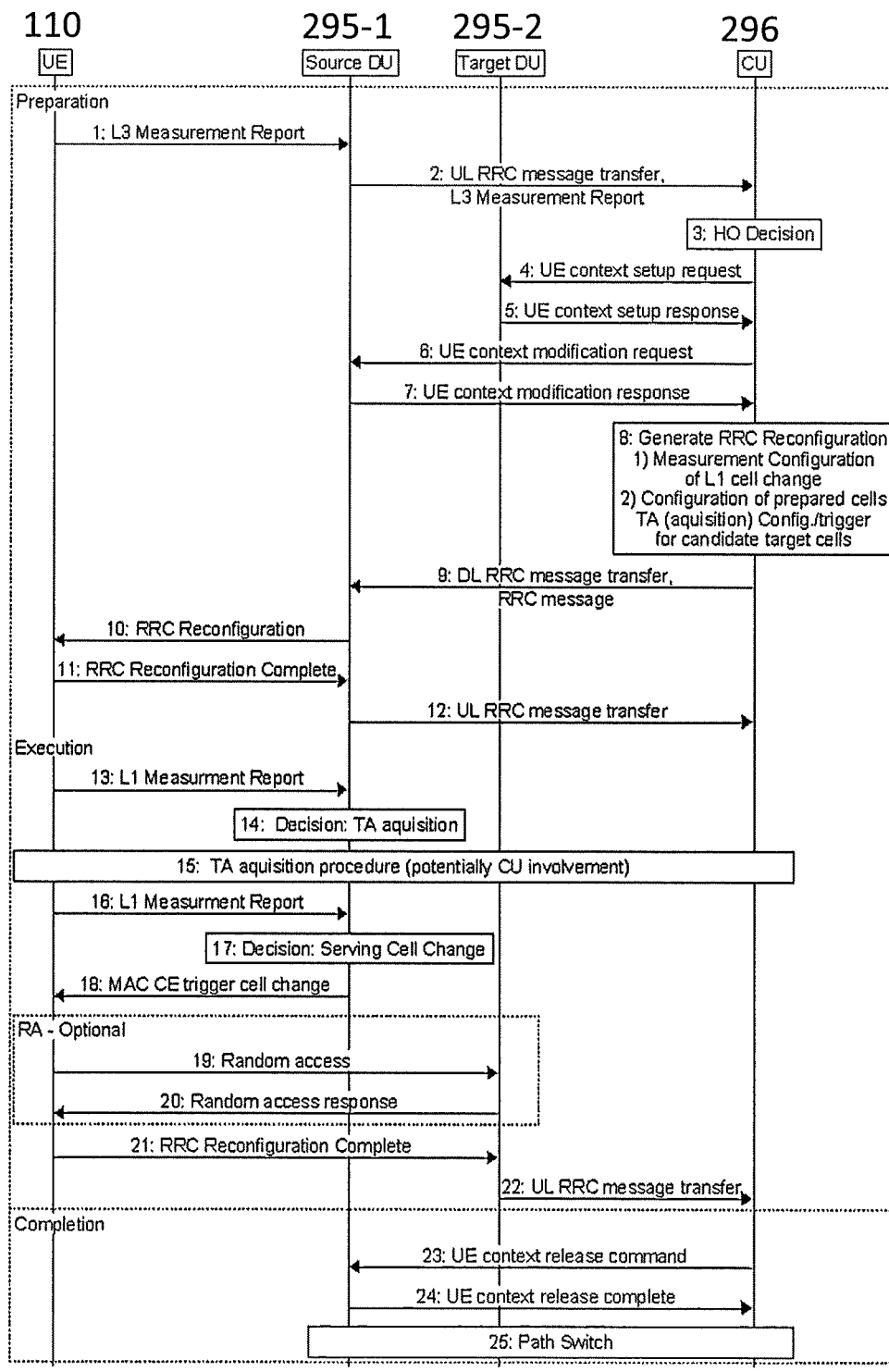
FIG. 2 is an exemplary signaling diagram for L1/2 triggered mobility (LTM).

FIG. 2 shows one exemplary message exchange for the inter-DU LTM scenario, captured for disaggregated architecture. As shown in FIG. 2, UE 110, source DU 295-1, target DU 295-2, and CU 296 perform signaling of information, as follows:

The UE 110 provides the L3 measurements to the source Distributed Unit (DU) 295-1, which are forwarded to the Centralized Unit (CU) 296 (steps 1-2). Based on these measurements, the CU decides about the cell preparation (HO Decision—step 3) and proceeds in setting up the UE context in the target DU 295-2 (steps 4-5). The CU communicates with the source DU for the modification of the UE context if needed and the provision of the target cell information (i.e., target cell RS configuration, TCI states, etc.) (steps 6-7).

In step 8, the CU creates and forwards the RRC Reconfiguration message to the source DU using a DL RRC Message Transfer and the latter forwards it to the UE (steps 9-10). The UE responds with an RRC Reconfiguration Complete to the CU (steps 11-12).

Based on its configuration, the UE provides the periodic L1 reports to the source DU (step 13).

Based on the received L1 measurement report, the source DU may trigger the UE, e.g., by sending a PDCCH order, to acquire TA for the set of candidate cells (i.e., candidate cells for the handover target cell) (steps 14-15).

The source-DU/CU and candidate target-DUs/CUs coordinate on the TA acquisition method during the LTM preparation phase (e.g., steps 14-15).

The UE continues L1 measurement reporting. Once the source DU decides that the UE should be handed over to a cell (i.e., target cell) of another DU (i.e., target DU) it triggers the cell switch, using a cell switch command (e.g., a MAC CE) (steps 16-18).

Then the UE applies the RRC configuration for the target cell of the target DU-indicated by the cell switch command (via MAC CE) and switches to the target DU. The UE may be configured to perform Random Access (RA) to the target cell as shown in steps 19-20; however, in other solutions, the UE may be configured to not perform the RA to the target cell as it has already acquired the TA of the target cell. To initiate the communication with the target DU, the UE transmits an RRC Reconfiguration Complete using already configured UL resources to the target cell of the target DU, which is forwarded to the CU-CP (steps 21-22).

The CU releases the UE context from the source DU with a UE Context Release Request and performs Path Switch to the new DU (steps 23-25).

Referring to FIG. 1 and FIG. 2, the source CU (e.g. CU 196 or CU 296) and/or the source DU (e.g. 295-1 or 195) is generally located in the serving gNB (e.g. a RAN node 170). The target DU (e.g. 295-2 or 195) may also be located in the same gNB such as RAN node 170 (intra-CU inter/intra-DU scenario) or a different gNB such as another RAN node 170 (inter-CU scenarios).

3GPP Working Group 1 (RAN1) Agreements on TA Acquisition for Rel-18 L1/L2 Triggered Mobility (LTM)

The following agreements are the sub-set of agreements made in the last two 3GPP Working Group 1 (RAN1) meetings (RAN1 #110-bis, October 2022 and RAN1 #111, November 2022) regarding the early Timing Advance (TA) acquisition of a candidate target cell for Rel-18 L1/L2 triggered mobility (LTM):

---

RAN1 #110-bis-e
  Support TA acquisition of candidate cell(s) before cell switch
  command is received in L1/L2 based mobility.
RAN1 #111
  On mechanism to acquire TA of the candidate cell(s) in Rel-18 LTM,
  at least support PDCCH ordered RACH.
    The PDCCH order is only triggered by source cell
    FFS: the details including content of DCI, RACH resource
    configuration, RAR transmission mechanism, etc.
    Note: any other RACH-based solutions are for discussion separately
RAN1#112 (Feb, 2023)
  The PDCCH order from the source cell contains the indication of
  candidate cell.
    The reserved bit(s) in DCI format 1_0 for PDCCH order can be
    used for indication of cell identity
  Study at least the following issues on PDCCH-order based PRACH for
  candidate cell that is not UL serving cell, i.e. without PUCCH/PUSCH
  configured -continued

| |
|---|
| Whether gap between the DCI and PRACH longer than timeline defined in spec is needed |
| Any impact/interruption on UL Tx of serving CCs due to the PRACH Tx |

Prioritizations for Transmission Power Reductions [Section 7.5, TS 38.213]

For single cell operation with two uplink carriers or for operation with carrier aggregation, if a total UE transmit power for PUSCH or PUCCH or PRACH or SRS transmissions on serving cells in a frequency range in a respective transmission occasion i would exceed $P\textasciicircum$ CMAX (i), where $P\textasciicircum$ CMAX (i) is the linear value of PCMAX (i) in transmission occasion i as defined in [8-1, TS 38.101-1] for FR1 and [8-2, TS 38.101-2] for FR2, the UE allocates power to PUSCH/PUCCH/PRACH/SRS transmissions according to the following priority order (in descending order) so that the total UE transmit power for transmissions on serving cells in the frequency range is smaller than or equal to $P\textasciicircum$CMAX (i) for that frequency range in every symbol of transmission occasion i. For the purpose of power allocation in this clause, if a UE is provided UCI-MuxWithDifferentPriority and the UE multiplexes HARQ-ACK information in a PUSCH, a priority index of the PUSCH is the larger of (a) the priority index of the PUSCH according to clause 9 and (b) the larger priority index of the HARQ-ACK information. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot:
  1. PRACH transmission on the PCell
  2. PUCCH or PUSCH transmissions with larger priority index
  3. For PUCCH or PUSCH transmissions with the same priority index, including i) PUCCH transmission with HARQ-ACK information, and/or SR, and/or LRR, or PUSCH transmission with HARQ-ACK information of the priority index, ii) PUCCH transmission with CSI or PUSCH transmission with CSI, iii) PUSCH transmission without HARQ-ACK information of the priority index or CSI and, for Type-2 random access procedure, PUSCH transmission on the PCell.
  4. SRS transmission, with aperiodic SRS having higher priority than semi-persistent and/or periodic SRS, or PRACH transmission on a serving cell other than the PCell In case of same priority order and for operation with carrier aggregation, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

When the network determines that the UE will be handed over to one of the LTM candidate cells (there may one or more candidates), it may determine to trigger a PDCCH ordered RACH for early TA acquisition prior to the LTM cell switch command.

Since a PDCCH ordered RACH is potentially associated with the upcoming cell switch command (the UE changes the serving cell, and moves to a candidate cell for which the PDCCH ordered RACH was triggered) it should be considered with a specific priority (i.e. the low latency and short interruption time are key performance indicators for mobility).

However, currently the power allocation prioritization rules for PRACH transmissions do not take into account a PRACH transmission towards a cell that is not a serving cell [section 7.5, TS 38.213]. The power allocation rules down prioritizes a PRACH transmission that is for a serving cell other than a PCell (i.e. an SCell). Furthermore, no priority rule is captured for a PDCCH ordered PRACH transmission for early TA acquisition for an LTM candidate cell (candidate for new PCell).

To determine the prioritization of transmission power allocations, the following aspects are considered.

In one embodiment, the UE may determine the power allocation priority for an uplink transmission based on whether the uplink transmission is associated with a cell configured for lower-layer mobility (in Rel-18 known as layer 1/layer 2 triggered mobility) or/and whether the uplink transmission is not associated with a serving cell.

In one further embodiment, the UE determines at least partly the priority for the power allocation for an uplink transmission based on whether the uplink transmission is associated with a candidate cell for lower layer mobility or/and whether the uplink transmission is associated with a cell for which a TA is to be acquired.

In a further embodiment, the priority may differ depending on whether a TCI state has been activated and/or whether a TCI state has been indicated for the candidate cell for which the UE transmits the UL transmission (e.g., PRACH preamble).

In one embodiment, when determining power allocation or the priority order for the power allocation for the UE transmission power, the UE may determine whether the target cell for an uplink transmission is associated with an LTM candidate cell and whether at least one TCI state has been activated for the LTE candidate cell.

In one embodiment, when determining power allocation or the priority order for the power allocation for the UE transmission power, the UE may determine whether the target cell for an uplink transmission is an LTM candidate cell and at least one TCI state has been indicated for the cell.

In one embodiment, when determining power allocation or the priority order for the power allocation for the UE transmission power, the UE may determine whether the target cell for an uplink transmission is an LTM candidate cell and downlink synchronization has been acquired or/and maintained or configured to be acquired for the cell.

In the above embodiments, the uplink transmission for an LTM candidate cell may be a PRACH transmission or SRS transmission (for TA acquisition in LTM).

In one embodiment, the PRACH transmission on the PCell has a higher priority than the PRACH/SRS transmission (e.g. for the TA acquisition) on a cell configured as an LTM candidate.

In one embodiment, the PRACH/SRS transmission (e.g., for the TA acquisition) on the cell configured as an LTM candidate has a higher priority than the PRACH transmission on the PCell. This priority may be applicable in general or when one or more of the following options are satisfied: i) in one option, if at least one TCI State has been activated for the candidate cell, ii) in one option, if at least one TCI State has been indicated for the candidate cell, and iii) in one option, if downlink synchronization has been acquired or/and maintained or configured to be acquired for the candidate cell.

In one embodiment, the PRACH/SRS transmission (e.g. for the TA acquisition) on the cell configured as an LTM candidate has a lower priority than PRACH on the PCell but higher priority than PUCCH, PUSCH on the PCell, and SRS/PUCCH/PUSCH on the serving cell that is not a PCell. This priority may be applicable in general or when one or more of the following options are satisfied: i) in one option, if at least one TCI State has been activated for the candidate cell, ii) in one option, if at least one TCI State has been indicated for the candidate cell, iii) in one option, if downlink synchronization has been acquired or/and maintained or configured to be acquired for the candidate cell.

In one embodiment, the PRACH transmission (e.g., for the TA acquisition) on the cell configured as an LTM candidate cell has a lower priority than PRACH on the PCell but higher priority than other SRS, PUCCH, PUSCH or PRACH on a serving cell that is not a PCell. This priority may be applicable in general or when one or more of the following options are satisfied: i) in one option, if at least one TCI state has been activated for the candidate cell, ii) in one option, if at least one TCI state has been indicated for the candidate cell, iii) in one option, if downlink synchronization has been acquired or/and maintained or configured to be acquired for the candidate cell.

In one embodiment, the PRACH/SRS transmission (e.g. for the TA acquisition) on the cell configured for as an LTM candidate cell has a priority higher than the PRACH transmission on the serving cell that is not a PCell.

In one embodiment, the PRACH/SRS transmission (e.g. for the TA acquisition) on the cell configured as an LTM candidate cell has higher priority than any transmission of other SRS, PUCCH, PUSCH, or PRACH on a serving cell that is not a PCell.

In one embodiment a priority list may be configured, comprising of one or more cell identifiers that are candidate cells for the LTM. If an LTM candidate cell is listed in a priority list, the cell may have higher priority for transmission power allocation than a cell that is not listed. In an option if the cell is not listed, the priority may be below PUCCH or PUSCH transmission of the PCell but higher than any other serving cell that is not a PCell or lower than any PUCCH/PUSCH for a serving cell.

In one embodiment, in general, when determining power allocation or the priority order for the power allocation for the UE transmission power, the UE may determine whether the target cell for an uplink transmission is an LTM candidate cell.

One possible implementation of the examples described herein that define the priority rules in TS 38.213 is provided below. The potential implementation options, wherein one or more of the options may be implemented, with respect to the current priority are in quotes, with comments provided within forward slashes (e.g. "//") and within the percent sign ("%").

---

7.5 Prioritizations for transmission power reductions

For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i as defined in [8-1, TS 38.101-1] for FR1 and [8-2, TS 38.101-2] for FR2, the UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. For the purpose of power allocation in this clause, if a UE is provided uci-MuxWithDiffPrio and the UE multiplexes HARQ-ACK information in a PUSCH, a priority index of the PUSCH is the larger of (a) the priority index of the PUSCH according to clause 9 and (b) the larger priority index of the HARQ-ACK information. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.
- PRACH transmission on the Pcell
  ///////////////// priority below PCell but above other UL transmissions/////////
"- PRACH/SRS transmission on a cell that is a candidate cell for LTM" % Option 1: PRACH transmission and SRS transmission are considered with a higher priority only second to the PRACH transmission on the PCell %
"- PRACH/SRS transmission on a cell that is a candidate cell fm LTM and at least one TCI State is activated for the candidate cell for LTM" % Option 2A: Similar to Option 1, only second to the PRACH transmission of PCell, but only valid if there is activated TCI state. %
"- OPT3 PRACH/SRS transmission on a call that is a candidate cell for LTM and at least one TCI State is indicated for the cell" % Option 3A: Similar to Option 1, only valid if there is indicated TCI state. %
  ///////////////// priority below PCell but above other UL transmissions/////////
- PUCCH or PUSCH transmissions with larger priority index
- For PUCCH or PUSCH transmissions with same priority index
- PUCCH transmission with HARQ-ACK information, and/or SR, and/or LRR, or PUSCH transmission with HARQ-ACK information of the priority index
- PUCCH transmission with CSI or PUSCH transmission with CSI
- PUSCH transmission without HARQ-ACK information of the priority index or CSI and, for Type-2 random access procedure, PUSCH transmission on the Pcell

| 7.5 Prioritizations for transmission power reductions |
|---|
| //////// Priority below other transmissions but above the SRS and PRACH on the serving cell other than PCell ////////
"- PRACH/SRS transmission on a cell that is a candidate cell for LTM" % Option 4: priority is lower than source cell PUCCH/PUSCH/PRACH %
"- PRACH/SRS transmission on a cell that is a candidate cell for LTM and at least one TCI State is activated for the candidate cell for LTM" % Option 5A: Similar to option 4, but only valid if there is an activated TCI state. %
"- PRACH/SRS transmission on a cell that is a candidate cell for LTM and at least one TCI State is activated and indicated for the cell" % Option 6A: Similar to option 4. but only valid if there is an indicated TCI state. %
//////// Priority below other transmission but above the SRS and PRACH on the serving cell other than PCell ////////
- SRS transmission, with aperiodic SRS having higher priority than semi-persistent and/or periodic SRS, "~~of~~" PRACH transmission on a serving cell other than the Pcell, "or PRACH/SRS transmission on a cell that is a candidate cell for LTM and there is no TCI State activation for the candidate cell for LTM" % Counterpart of Option 2A & 5A, when there is no valid activated TCI state, priority is lower. For the counterpart of Option 2A & 5A, "activation" can be replaced with "indication" %
In case of same priority order and for operation with carrier aggregation, the UE prioritzes power allocation for transmissions on the primary cell of the MCG or the SCG over transmissions on a secondary cell. In case of same priority order and for operation with two UL carriers, the UE priorities power allocation for transmissions on the carrier where the UE is configured to transmit PUCCH. If PUCCH is not configured for any of the two UL carriers, the UE prioritizes power allocation for transmissions on the non-supplementary UL carrier. |

From the perspective of a UE (e.g. UE 110) or a network (e.g. RAN node 170, network element(s) 190, source DU 295-1, target DU 295-2, or CU 296), various power prioritization rules may be defined or implemented, as follows (1-6):

1. A power prioritization rule may be that a power allocation priority for an uplink physical random access channel transmission is higher than a power allocation priority for at least one of: a physical uplink shared channel transmission, a physical uplink control channel transmission, a sounding reference signal transmission on a serving cell other than a primary cell, or a physical random access channel transmission on a serving cell other than a primary cell.
2. A power prioritization rule may be that a power allocation priority for an uplink physical random access channel transmission on a candidate cell configured for layer 1 or layer 2 triggered mobility is lower than a power allocation priority for at least one of a power allocation priority for a physical random access channel transmission on a primary cell, a physical uplink shared channel transmission, or a physical uplink control channel transmission.
3. A power prioritization rule may be that a power allocation priority for an uplink physical random access channel transmission on a candidate cell configured for layer 1 or layer 2 triggered mobility is higher than or the same as a power allocation priority for at least one of a physical random access channel transmission on a primary cell, a physical uplink shared channel transmission or a physical uplink control channel transmission.
4. A power prioritization rule may be that a power allocation priority for an uplink physical random access channel transmission on a candidate cell configured for layer 1 or layer 2 triggered mobility without at least one of an activated transmission configuration indicator state or an indicated transmission configuration indicator state is lower than a power allocation priority for at least one of a physical random access channel transmission on a primary cell, a physical uplink shared channel transmission, or a physical uplink control channel transmission.
5. A power prioritization rule may be that a power allocation priority for the uplink physical random access channel transmission on the candidate cell configured for layer 1 or layer 2 triggered mobility without at least one of an activated transmission configuration indicator state or an indicated transmission configuration indicator state is the same as a power allocation priority for at least one of a sounding reference signal transmission or a physical random access channel transmission on a serving cell other than a primary cell.
6. A power prioritization rule may be at least partly that a power allocation priority for an uplink physical random access channel transmission is based on whether the uplink physical random access channel transmission is associated with a cell for which a timing acquisition is to be acquired.

If a network knows that a transmission (e.g., SRS) will be deprioritized based on the priority rule then the network may apply a stronger receive beam forming gain at the network side to compensate the lower transmission power.

Figure 3:
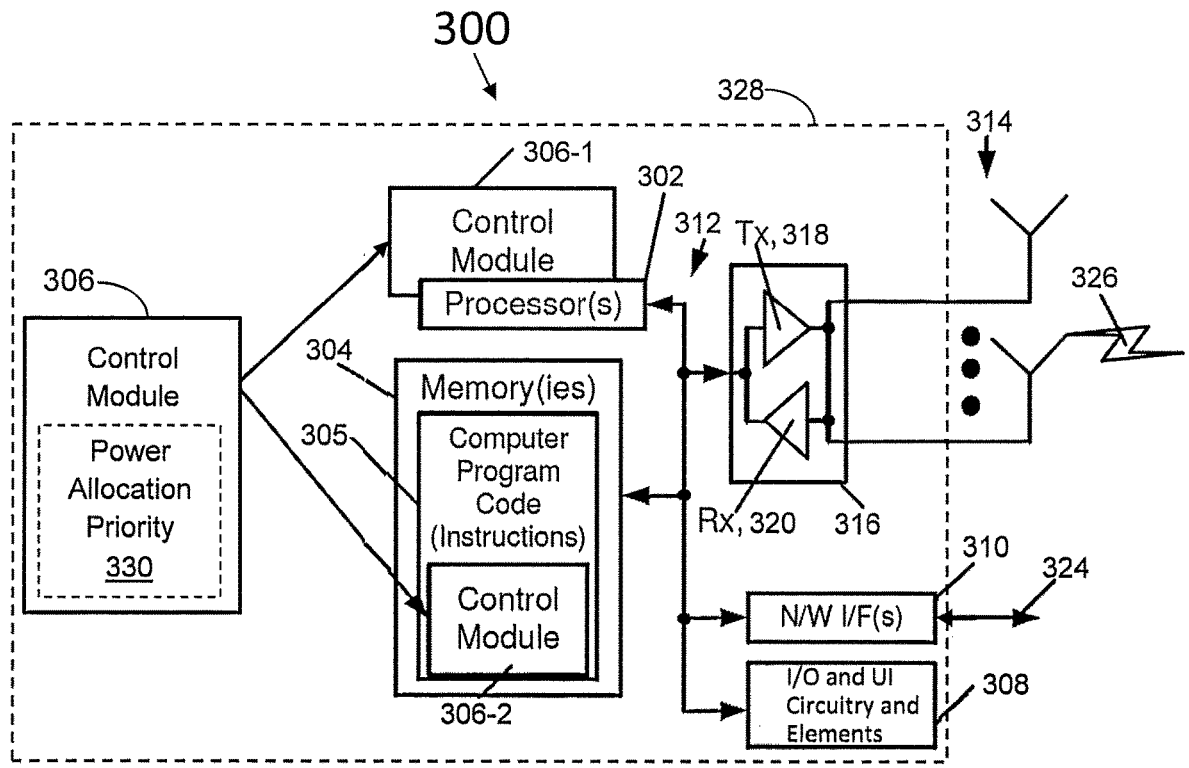
FIG. 3 is an example apparatus configured to implement the examples described herein.

FIG. 3 is an example apparatus 300, which may be implemented in hardware, configured to implement the examples described herein. The apparatus 300 comprises at least one processor 302 (e.g. an FPGA and/or CPU), one or more memories 304 including computer program code 305, the computer program code 305 having instructions to carry out the methods described herein, wherein the at least one memory 304 and the computer program code 305 are configured to, with the at least one processor 302, cause the apparatus 300 to implement circuitry, a process, component, module, or function (implemented with control module 306) to implement the examples described herein, including priority for the power allocation for PRACH transmission for TA acquisition. Optionally included power allocation priority 330 of the control module 306 implements the herein described methods for determining power allocation priority. The memory 304 may be a non-transitory memory, a transitory memory, a volatile memory (e.g. RAM), or a non-volatile memory (e.g. ROM).

The apparatus 300 includes a display and/or I/O interface 308, which includes user interface (UI) circuitry and elements, that may be used to display aspects or a status of the methods described herein (e.g., as one of the methods is being performed or at a subsequent time), or to receive input from a user such as with using a keypad, camera, touch-screen, touch area, microphone, biometric recognition, one or more sensors, etc. The apparatus 300 includes one or more communication e.g. network (N/W) interfaces (I/F(s)) 310. The communication I/F(s) 310 may be wired and/or wireless and communicate over the Internet/other network(s) via any communication technique including via one or more links 324. The link(s) 324 may be the link(s) 131 and/or 176 from FIG. 1. The link(s) 131 and/or 176 from FIG. 1 may also be implemented using transceiver(s) 316 and corresponding wireless link(s) 326. The communication I/F(s) 310 may comprise one or more transmitters or one or more receivers.

The transceiver 316 comprises one or more transmitters 318 and one or more receivers 320. The transceiver 316 and/or communication I/F(s) 310 may comprise standard well-known components such as an amplifier, filter, frequency-converter, (de) modulator, and encoder/decoder circuitries and one or more antennas, such as antennas 314 used for communication over wireless link 326.

The control module 306 of the apparatus 300 comprises one of or both parts 306-1 and/or 306-2, which may be implemented in a number of ways. The control module 306 may be implemented in hardware as control module 306-1, such as being implemented as part of the one or more processors 302. The control module 306-1 may be implemented also as an integrated circuit or through other hardware such as a programmable gate array. In another example, the control module 306 may be implemented as control module 306-2, which is implemented as computer program code (having corresponding instructions) 305 and is executed by the one or more processors 302. For instance, the one or more memories 304 store instructions that, when executed by the one or more processors 302, cause the apparatus 300 to perform one or more of the operations as described herein. Furthermore, the one or more processors 302, one or more memories 304, and example algorithms (e.g., as flowcharts and/or signaling diagrams), encoded as instructions, programs, or code, are means for causing performance of the operations described herein.

The apparatus 300 to implement the functionality of control 306 may be UE 110, RAN node 170, for example, gNB, base station, a network node, etc., or network element(s) 190. Thus, processor 302 may correspond to processor(s) 120, processor(s) 152 and/or processor(s) 175, memory 304 may correspond to one or more memories 125, one or more memories 155 and/or one or more memories 171, computer program code 305 may correspond to computer program code 123, computer program code 153, and/or computer program code 173, control module 306 may correspond to module 140-1, module 140-2, module 150-1, and/or module 150-2, and communication I/F(s) 310 and/or transceiver 316 may correspond to transceiver 130, antenna(s) 128, transceiver 160, antenna(s) 158, N/W I/F(s) 161, and/or N/W I/F(s) 180. Alternatively, apparatus 300 and its elements may not correspond to either of UE 110, RAN node 170, or network element(s) 190 and their respective elements, as apparatus 300 may be part of a self-organizing/optimizing network (SON) node or other node, such as a node in a cloud. The apparatus 300 to implement the functionality of control 306 may also correspond to source DU 295-1, target DU 295-2, or CU 296 (or may not).

The apparatus 300 may also be distributed throughout the network (e.g. 100) including within and between apparatus 300 and any network element (such as a network control element (NCE) 190 and/or the RAN node 170 and/or the UE 110).

Interface 312 enables data communication and signaling between the various items of apparatus 300, as shown in FIG. 3. For example, the interface 312 may be one or more buses such as address, data, or control buses, and may include any interconnection mechanism, such as a series of lines on a motherboard or integrated circuit, fiber optics or other optical communication equipment, and the like. Computer program code (e.g. instructions) 305, including control 306 may comprise object-oriented software configured to pass data or messages between objects within computer program code 305. The apparatus 300 need not comprise each of the features mentioned, or may comprise other features as well. The various components of apparatus 300 may at least partially reside in a common housing 328, or a subset of the various components of apparatus 300 may at least partially be located in different housings, which different housings may include housing 328.

Figure 4:
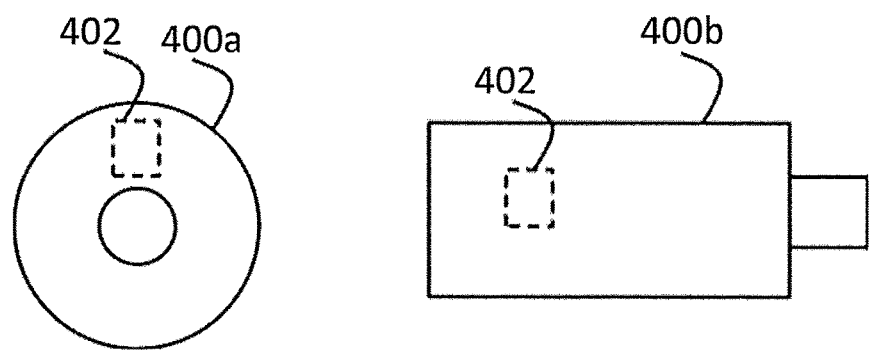
FIG. 4 shows a representation of an example of non-volatile memory media used to store instructions that implement the examples described herein.

FIG. 4 shows a schematic representation of non-volatile memory media 400a (e.g. computer/compact disc (CD) or digital versatile disc (DVD)) and 400b (e.g. universal serial bus (USB) memory stick) storing instructions and/or parameters 402 which when executed by a processor allows the processor to perform one or more of the steps of the methods described herein.

Figure 5:
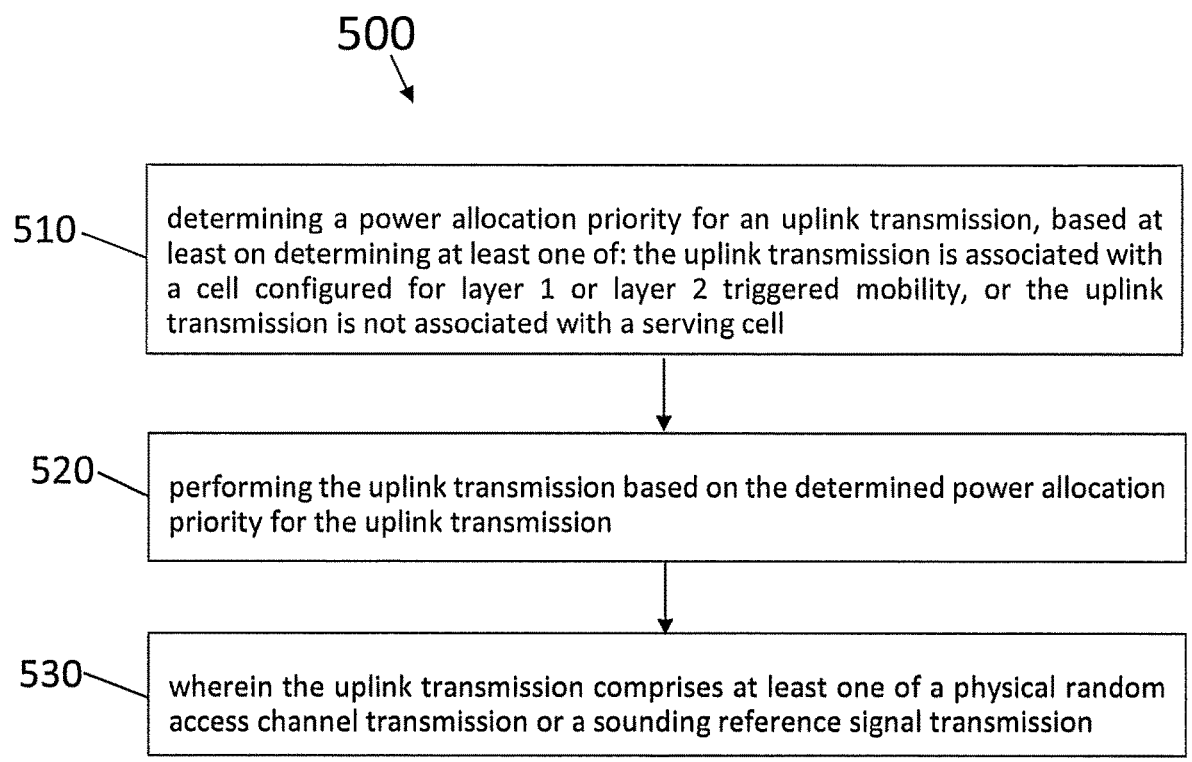
FIG. 5 is an example method, based on the examples described herein.

FIG. 5 is an example method 500, based on the example embodiments described herein. At 510, the method includes determining a power allocation priority for an uplink transmission, based at least on determining at least one of: the uplink transmission is associated with a cell configured for layer 1 or layer 2 triggered mobility, or the uplink transmission is not associated with a serving cell. At 520, the method includes performing the uplink transmission based on the determined power allocation priority for the uplink transmission. At 530, the method includes wherein the uplink transmission comprises at least one of a physical random access channel transmission or a sounding reference signal transmission. Method 500 may be performed with UE 110 or apparatus 300.

Figure 6:
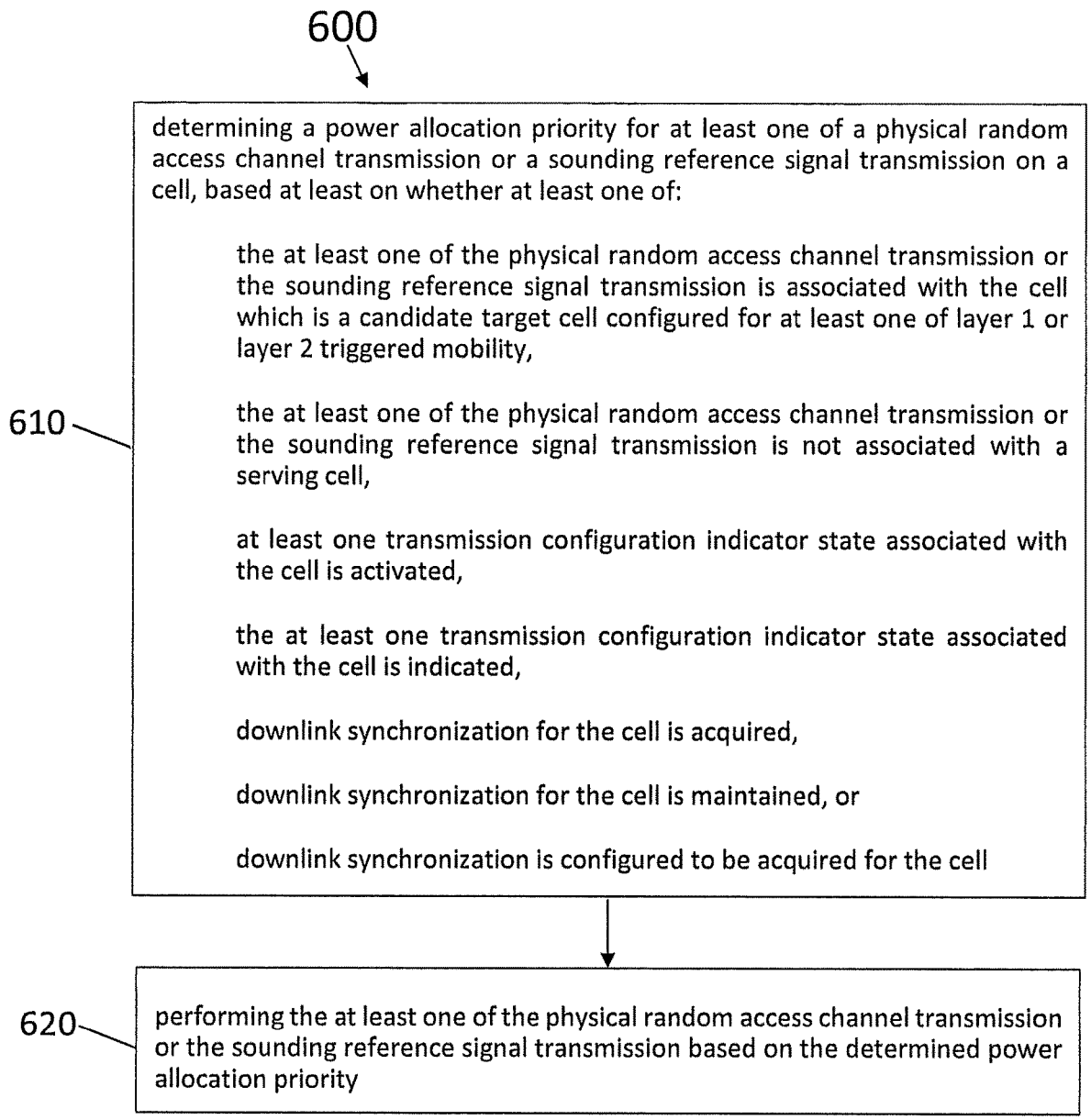
FIG. 6 is an example method, based on the examples described herein.

FIG. 6 is an example method 600, based on the example embodiments described herein. At 610, the method includes determining a power allocation priority for at least one of a physical random access channel transmission or a sounding reference signal transmission on a cell, based at least on whether at least one of: the at least one of the physical random access channel transmission or the sounding reference signal transmission is associated with the cell which is a candidate target cell configured for at least one of layer 1 or layer 2 triggered mobility, the at least one of the physical random access channel transmission or the sounding reference signal transmission is not associated with a serving cell, at least one transmission configuration indicator state associated with the cell is activated, the at least one transmission configuration indicator state associated with the cell is indicated, downlink synchronization for the cell is acquired, downlink synchronization for the cell is maintained, or downlink synchronization is configured to be acquired for the cell. At 620, the method includes performing the at least one of the physical random access channel transmission or the sounding reference signal transmission based on the determined power allocation priority. Method 600 may be performed with UE 110 or apparatus 300.

Figure 7:
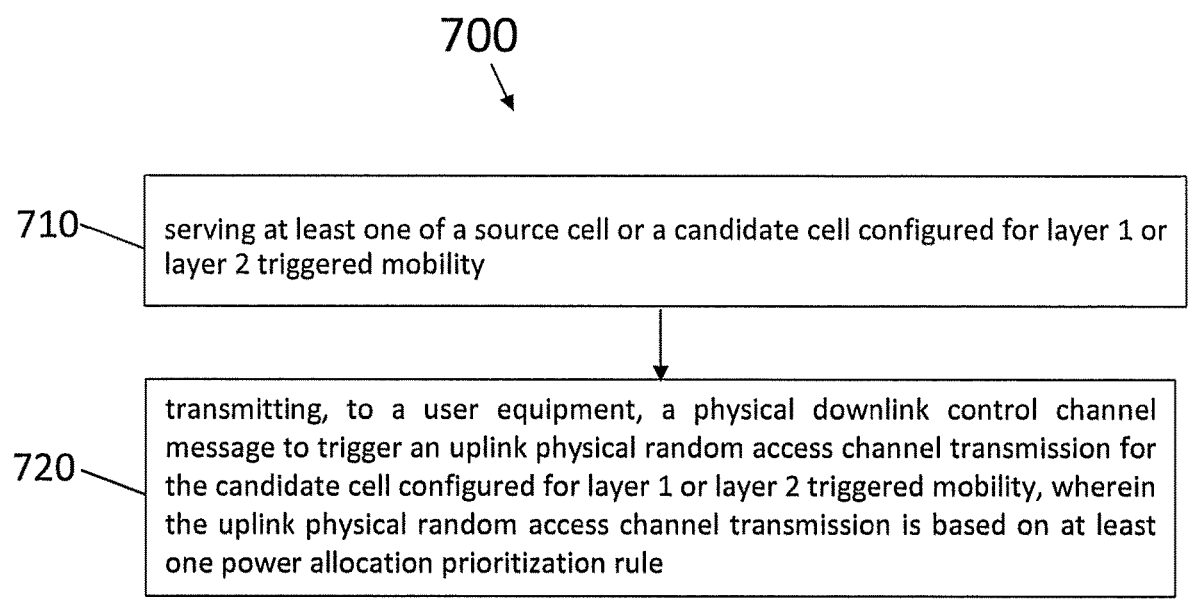
FIG. 7 is an example method, based on the examples described herein.

FIG. 7 is an example method 700, based on the example embodiments described herein. At 710, the method includes serving at least one of a source cell or a candidate cell configured for layer 1 or layer 2 triggered mobility. At 720, the method includes transmitting, to a user equipment, a physical downlink control channel message to trigger an uplink physical random access channel transmission for the candidate cell configured for layer 1 or layer 2 triggered mobility, wherein the uplink physical random access channel transmission is based on at least one power allocation prioritization rule. Method 700 may be performed with RAN node 170, DU 195, CU 196, network element(s) 190, source DU 295-1, target DU 295-2, CU 296, or apparatus 300.

The following examples are provided and described herein.

Example 1. An apparatus including: at least one processor; and at least one memory storing instructions that, when executed by the at least one processor, cause the apparatus at least to: determine a power allocation priority for an uplink transmission, based at least on determining at least one of: the uplink transmission is associated with a cell configured for layer 1 or layer 2 triggered mobility, or the uplink transmission is not associated with a serving cell; and perform the uplink transmission based on the determined power allocation priority for the uplink transmission, wherein the uplink transmission comprises at least one of a physical random access channel transmission or a sounding reference signal transmission.

Example 2. The apparatus of example 1, wherein the uplink transmission comprises the physical random access channel transmission.

Example 3. The apparatus of example 1, wherein the uplink transmission comprises the sounding reference signal transmission.

Example 4. The apparatus of example 1, wherein the at least one memory stores instructions that, when executed by the at least one processor, cause the apparatus at least to: determine the power allocation priority for the uplink transmission on a candidate target cell for layer 1 or layer 2 triggered mobility, based at least on whether at least one of: at least one transmission configuration indicator state is activated, the at least one transmission configuration indicator state is indicated, downlink synchronization is acquired, downlink synchronization is maintained, or downlink synchronization is configured to be acquired for the candidate target cell.

Example 5. The apparatus of any of examples 1 to 4, wherein the at least one memory stores instructions that, when executed by the at least one processor, cause the apparatus at least to: determine the power allocation priority for the uplink transmission to be higher than a power allocation priority for at least one of: a physical uplink shared channel transmission a physical uplink control channel transmission, a sounding reference signal transmission on a serving cell other than a primary cell, or a physical random access channel transmission on a serving cell other than a primary cell.

Example 6. The apparatus of any of examples 1 to 4, wherein the at least one memory stores instructions that, when executed by the at least one processor, cause the apparatus at least to: determine the power allocation priority for the uplink transmission on a candidate target cell for layer 1 or layer 2 triggered mobility to be lower than a power allocation priority for at least one of a physical random access channel transmission on a primary cell, a physical uplink shared channel transmission, or a physical uplink control channel transmission.

Example 7. The apparatus of any of examples 1 to 4, wherein the at least one memory stores instructions that, when executed by the at least one processor, cause the apparatus at least to: determine the power allocation priority for the uplink transmission on a candidate target cell for layer 1 or layer 2 triggered mobility to be higher than or the same as a power allocation priority for at least one of a physical random access channel transmission on a primary cell, a physical uplink shared channel transmission, or a physical uplink control channel transmission.

Example 8. The apparatus of any of examples 1 to 4, wherein the at least one memory stores instructions that, when executed by the at least one processor, cause the apparatus at least to: determine the power allocation priority for the uplink transmission on a candidate target cell for layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

Example 9. The apparatus of any of examples 1 to 4, wherein the at least one memory stores instructions that, when executed by the at least one processor, cause the apparatus at least to: determine the power allocation priority for the uplink transmission on a candidate target cell for layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

Example 10. The apparatus of any of examples 1 to 9, wherein the at least one memory stores instructions that, when executed by the at least one processor, cause the apparatus at least to: determine at least partly the power allocation priority for the uplink transmission based on whether the uplink transmission is associated with a cell for which a timing acquisition is to be acquired.

Example 11. The apparatus of any of examples 1 to 10, wherein the cell configured for layer 1 or layer 2 triggered mobility comprises a candidate target cell configured for layer 1 or layer 2 triggered mobility.

Example 12. The apparatus of any of examples 1 to 11, wherein the apparatus comprises a user equipment.

Example 13. An apparatus including: at least one processor; and at least one memory storing instructions that, when executed by the at least one processor, cause the apparatus at least to: determine a power allocation priority for at least one of a physical random access channel transmission or a sounding reference signal transmission on a cell, based at least on whether at least one of: the at least one of the physical random access channel transmission or the sounding reference signal transmission is associated with the cell which is a candidate target cell configured for at least one of layer 1 or layer 2 triggered mobility, the at least one of the physical random access channel transmission or the sounding reference signal transmission is not associated with a serving cell, at least one transmission configuration indicator state associated with the cell is activated, the at least one transmission configuration indicator state associated with the cell is indicated, downlink synchronization for the cell is acquired, downlink synchronization for the cell is maintained, or downlink synchronization is configured to be acquired for the cell; and perform the at least one of the physical random access channel transmission or the sounding reference signal transmission based on the determined power allocation priority.

Example 14. The apparatus of example 13, wherein the at least one memory stores instructions that, when executed by the at least one processor, cause the apparatus at least to: determine the power allocation priority for the physical random access channel transmission; and perform the physical random access channel transmission.

Example 15. The apparatus of example 13, wherein the at least one memory stores instructions that, when executed by the at least one processor, cause the apparatus at least to: determine the power allocation priority for the sounding reference signal transmission; and perform the sounding reference signal transmission.

Example 16. The apparatus of any of examples 13 to 15, wherein the at least one memory stores instructions that, when executed by the at least one processor, cause the apparatus at least to: determine the power allocation priority for the at least one of the physical random access channel transmission or the sounding reference signal transmission to be higher than a power allocation priority for at least one of: a physical uplink shared channel transmission, a physical uplink control channel transmission, a sounding reference signal transmission on a serving cell other than a primary cell, or a physical random access channel transmission on a serving cell other than a primary cell.

Example 17. The apparatus of any of examples 13 to 15, wherein the at least one memory stores instructions that, when executed by the at least one processor, cause the apparatus at least to: determine the power allocation priority for the at least one of the physical random access channel transmission or the sounding reference signal transmission on the candidate target cell configured for at least one of layer 1 or layer 2 triggered mobility to be lower than a power allocation priority for at least one of a physical random access channel transmission on a primary cell, a physical uplink shared channel transmission, or a physical uplink control channel transmission.

Example 18. The apparatus of any of examples 13 to 15, wherein the at least one memory stores instructions that, when executed by the at least one processor, cause the apparatus at least to: determine the power allocation priority for the at least one of the physical random access channel transmission or the sounding reference signal transmission on the candidate target cell configured for at least one of layer 1 or layer 2 triggered mobility to be higher than or the same as a power allocation priority for at least one of a physical random access channel transmission on a primary cell, a physical uplink shared channel transmission or a physical uplink control channel transmission.

Example 19. The apparatus of any of examples 13 to 15, wherein the at least one memory stores instructions that, when executed by the at least one processor, cause the apparatus at least to: determine the power allocation priority for the at least one of the physical random access channel transmission or the sounding reference signal transmission on the candidate target cell configured for at least one of layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

Example 20. The apparatus of any of examples 13 to 15, wherein the at least one memory stores instructions that, when executed by the at least one processor, cause the apparatus at least to: determine the power allocation priority for the at least one of the physical random access channel transmission or the sounding reference signal transmission on the candidate target cell configured for at least one of layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

Example 21. The apparatus of any of examples 13 to 20, wherein the at least one memory stores instructions that, when executed by the at least one processor, cause the apparatus at least to: determine at least partly the power allocation priority for the at least one of the physical random access channel transmission or the sounding reference signal transmission based on whether the at least one of the physical random access channel transmission or the sounding reference signal transmission is associated with a cell for which a timing acquisition is to be acquired.

Example 22. The apparatus of any of examples 13 to 21, wherein the apparatus comprises a user equipment.

Example 23. An apparatus including: at least one processor; and at least one memory storing instructions that, when executed by the at least one processor, cause the apparatus at least to: serve at least one of a source cell or a candidate cell configured for layer 1 or layer 2 triggered mobility; and transmit, to a user equipment, a physical downlink control channel message to trigger an uplink physical random access channel transmission for the candidate cell configured for layer 1 or layer 2 triggered mobility, wherein the uplink physical random access channel transmission is based on at least one power allocation prioritization rule.

Example 24. The apparatus of example 23, wherein the at least one memory stores instructions that, when executed by the at least one processor, cause the apparatus at least to: receive, from the user equipment, the uplink physical random access channel transmission for the candidate cell configured for layer 1 or layer 2 triggered mobility.

Example 25. The apparatus of example 23 or 24, wherein the at least one memory stores instructions that, when executed by the at least one processor, cause the apparatus at least to: transmit, to the user equipment, the at least one power allocation prioritization rule.

Example 26. The apparatus of any of examples 23 to 25, wherein a power of the uplink physical random access channel transmission is prioritized based on the at least one power allocation prioritization rule.

Example 27. The apparatus of any of examples 23 to 26, wherein the at least one power allocation prioritization rule is based on whether at least one of: the uplink physical random access channel transmission is associated with the candidate cell configured for layer 1 or layer 2 triggered mobility, or the uplink physical random access channel transmission is not associated with a serving cell.

Example 28. The apparatus of any of examples 23 to 27, wherein the at least one power allocation prioritization rule is based at least on whether at least one of: at least one transmission configuration indicator state is activated, the at least one transmission configuration indicator state is indicated, downlink synchronization is acquired, downlink synchronization is maintained, or downlink synchronization is configured to be acquired for the candidate cell.

Example 29. The apparatus of any of examples 23 to 28, wherein the apparatus serves the candidate cell configured for layer 1 or layer 2 triggered mobility.

Example 30. The apparatus of any of examples 23 or 25 to 28, wherein the apparatus serves the source cell.

Example 31. The apparatus of any of examples 23 to 30, wherein the apparatus comprises a centralized unit.

Example 32. The apparatus of any of examples 23 to 31, wherein the apparatus comprises a distributed unit.

Example 33. The apparatus of any of examples 23 to 32, wherein the at least one memory stores instructions that, when executed by the at least one processor, cause the apparatus at least to: apply a stronger receive beam forming gain at the apparatus to compensate for a lower transmission power of an uplink transmission.

Example 34. The apparatus of example 33, wherein the uplink transmission comprises at least one of a physical random access channel transmission on a primary cell, a physical uplink shared channel transmission, a physical uplink control channel transmission, a sounding reference signal transmission on a serving cell other than a primary cell, or a physical random access channel transmission on a serving cell other than a primary cell.

Example 35. A method including: determining a power allocation priority for an uplink transmission, based at least on determining at least one of: the uplink transmission is associated with a cell configured for layer 1 or layer 2 triggered mobility, or the uplink transmission is not associated with a serving cell; and performing the uplink transmission based on the determined power allocation priority for the uplink transmission, wherein the uplink transmission comprises at least one of a physical random access channel transmission or a sounding reference signal transmission.

Example 36. The method of example 35, wherein the uplink transmission comprises the physical random access channel transmission.

Example 37. The method of example 35, wherein the uplink transmission comprises the sounding reference signal transmission.

Example 38. The method of example 35, further including: determining the power allocation priority for the uplink transmission on a candidate target cell for layer 1 or layer 2 triggered mobility, based at least on whether at least one of: at least one transmission configuration indicator state is activated, the at least one transmission configuration indicator state is indicated, downlink synchronization is acquired, downlink synchronization is maintained, or downlink synchronization is configured to be acquired for the candidate target cell.

Example 39. The method of any of examples 35 to 38, further including: determining the power allocation priority for the uplink transmission to be higher than a power allocation priority for at least one of: a physical uplink shared channel transmission, a physical uplink control channel transmission, a sounding reference signal transmission on a serving cell other than a primary cell, or a physical random access channel transmission on a serving cell other than a primary cell.

Example 40. The method of any of examples 35 to 38, further including: determining the power allocation priority for the uplink transmission on a candidate target cell for layer 1 or layer 2 triggered mobility to be lower than a power allocation priority for at least one of a physical random access channel transmission on a primary cell, a physical uplink shared channel transmission, or a physical uplink control channel transmission.

Example 41. The method of any of examples 35 to 38, further including: determining the power allocation priority for the uplink transmission on a candidate target cell for layer 1 or layer 2 triggered mobility to be higher than or the same as a power allocation priority for at least one of a physical random access channel transmission on a primary cell, a physical uplink shared channel transmission, or a physical uplink control channel transmission.

Example 42. The method of any of examples 35 to 38, further including: determining the power allocation priority for the uplink transmission on a candidate target cell for layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

Example 43. The method of any of examples 35 to 38, further including: determining the power allocation priority for the uplink transmission on a candidate target cell for layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

Example 44. The method of any of examples 35 to 43, further including: determining at least partly the power allocation priority for the uplink transmission based on whether the uplink transmission is associated with a cell for which a timing acquisition is to be acquired.

Example 45. The method of any of examples 35 to 44, wherein the cell configured for layer 1 or layer 2 triggered mobility comprises a candidate target cell configured for layer 1 or layer 2 triggered mobility.

Example 46. The method of any of examples 35 to 45, wherein the method is performed with a user equipment.

Example 47. A method including: determining a power allocation priority for at least one of a physical random access channel transmission or a sounding reference signal transmission on a cell, based at least on whether at least one of: the at least one of the physical random access channel transmission or the sounding reference signal transmission is associated with the cell which is a candidate target cell configured for at least one of layer 1 or layer 2 triggered mobility, the at least one of the physical random access channel transmission or the sounding reference signal transmission is not associated with a serving cell, at least one transmission configuration indicator state associated with the cell is activated, the at least one transmission configuration indicator state associated with the cell is indicated, downlink synchronization for the cell is acquired, downlink synchronization for the cell is maintained, or downlink synchronization is configured to be acquired for the cell; and performing the at least one of the physical random access channel transmission or the sounding reference signal transmission based on the determined power allocation priority.

Example 48. The method of example 47, further including: determining the power allocation priority for the physical random access channel transmission; and performing the physical random access channel transmission.

Example 49. The method of example 47, further including: determining the power allocation priority for the sounding reference signal transmission; and performing the sounding reference signal transmission.

Example 50. The method of any of examples 47 to 49, further including: determining the power allocation priority for the at least one of the physical random access channel transmission or the sounding reference signal transmission to be higher than a power allocation priority for at least one of: a physical uplink shared channel transmission, a physical uplink control channel transmission, a sounding reference signal transmission on a serving cell other than a primary cell, or a physical random access channel transmission on a serving cell other than a primary cell.

Example 51. The method of any of examples 47 to 49, further including: determining the power allocation priority for the at least one of the physical random access channel transmission or the sounding reference signal transmission on the candidate target cell configured for at least one of layer 1 or layer 2 triggered mobility to be lower than a power allocation priority for at least one of a physical random access channel transmission on a primary cell, a physical uplink shared channel transmission, or a physical uplink control channel transmission.

Example 52. The method of any of examples 47 to 49, further including: determining the power allocation priority for the at least one of the physical random access channel transmission or the sounding reference signal transmission on the candidate target cell configured for at least one of layer 1 or layer 2 triggered mobility to be higher than or the same as a power allocation priority for at least one of a physical random access channel transmission on a primary cell, a physical uplink shared channel transmission or a physical uplink control channel transmission.

Example 53. The method of any of examples 47 to 49, further including: determining the power allocation priority for the at least one of the physical random access channel transmission or the sounding reference signal transmission on the candidate target cell configured for at least one of layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

Example 54. The method of any of examples 47 to 49, further including: determining the power allocation priority for the at least one of the physical random access channel transmission or the sounding reference signal transmission on the candidate target cell configured for at least one of layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

Example 55. The method of any of examples 47 to 54, further including: determining at least partly the power allocation priority for the at least one of the physical random access channel transmission or the sounding reference signal transmission based on whether the at least one of the physical random access channel transmission or the sounding reference signal transmission is associated with a cell for which a timing acquisition is to be acquired.

Example 56. The method of any of examples 47 to 55, wherein the method is performed with a user equipment.

Example 57. A method including: serving at least one of a source cell or a candidate cell configured for layer 1 or layer 2 triggered mobility; and transmitting, to a user equipment, a physical downlink control channel message to trigger an uplink physical random access channel transmission for the candidate cell configured for layer 1 or layer 2 triggered mobility, wherein the uplink physical random access channel transmission is based on at least one power allocation prioritization rule.

Example 58. The method of example 57, further including: receiving, from the user equipment, the uplink physical random access channel transmission for the candidate cell configured for layer 1 or layer 2 triggered mobility.

Example 59. The method of example 57 or 58, further including: transmitting, to the user equipment, the at least one power allocation prioritization rule.

Example 60. The method of any of examples 57 to 59, wherein a power of the uplink physical random access channel transmission is prioritized based on the at least one power allocation prioritization rule.

Example 61. The method of any of examples 57 to 60, wherein the at least one power allocation prioritization rule is based on whether at least one of: the uplink physical random access channel transmission is associated with the candidate cell configured for layer 1 or layer 2 triggered mobility, or the uplink physical random access channel transmission is not associated with a serving cell.

Example 62. The method of any of examples 57 to 61, wherein the at least one power allocation prioritization rule is based at least on whether at least one of: at least one transmission configuration indicator state is activated, the at least one transmission configuration indicator state is indicated, downlink synchronization is acquired, downlink synchronization is maintained, or downlink synchronization is configured to be acquired for the candidate cell.

Example 63. The method of any of examples 57 to 62, performed with an apparatus that serves the candidate cell configured for layer 1 or layer 2 triggered mobility.

Example 64. The method of any of examples 57 or 59 to 62, performed with an apparatus that serves the source cell.

Example 65. The method of any of examples 57 to 64, wherein the method is performed with a centralized unit.

Example 66. The method of any of examples 57 to 65, wherein the method is performed with a distributed unit.

Example 67. The method of any of examples 57 to 66, further including: applying a stronger receive beam forming gain at an apparatus that performs the method to compensate for a lower transmission power of an uplink transmission.

Example 68. The method of example 67, wherein the uplink transmission comprises at least one of a physical random access channel transmission on a primary cell, a physical uplink shared channel transmission, a physical uplink control channel transmission, a sounding reference signal transmission on a serving cell other than a primary cell, or a physical random access channel transmission on a serving cell other than a primary cell.

Example 69. An apparatus including: means for determining a power allocation priority for an uplink transmission, based at least on determining at least one of: the uplink transmission is associated with a cell configured for layer 1 or layer 2 triggered mobility, or the uplink transmission is not associated with a serving cell; and means for performing the uplink transmission based on the determined power allocation priority for the uplink transmission, wherein the uplink transmission comprises at least one of a physical random access channel transmission or a sounding reference signal transmission.

Example 70. An apparatus including: means for determining a power allocation priority for at least one of a physical random access channel transmission or a sounding reference signal transmission on a cell, based at least on whether at least one of: the at least one of the physical random access channel transmission or the sounding reference signal transmission is associated with the cell which is a candidate target cell configured for at least one of layer 1 or layer 2 triggered mobility, the at least one of the physical random access channel transmission or the sounding reference signal transmission is not associated with a serving cell, at least one transmission configuration indicator state associated with the cell is activated, the at least one transmission configuration indicator state associated with the cell is indicated, downlink synchronization for the cell is acquired, downlink synchronization for the cell is maintained, or downlink synchronization is configured to be acquired for the cell; and means for performing the at least one of the physical random access channel transmission or the sounding reference signal transmission based on the determined power allocation priority.

Example 71. An apparatus including: means for serving at least one of a source cell or a candidate cell configured for layer 1 or layer 2 triggered mobility; and means for transmitting, to a user equipment, a physical downlink control channel message to trigger an uplink physical random access channel transmission for the candidate cell configured for layer 1 or layer 2 triggered mobility, wherein the uplink physical random access channel transmission is based on at least one power allocation prioritization rule.

Example 72. An apparatus including means for performing the method of any of examples 35-46, 47-56, and 57-68.

Example 73. A non-transitory program storage device readable by a machine, tangibly embodying a program of instructions executable by the machine for performing operations, the operations including: determining a power allocation priority for an uplink transmission, based at least on determining at least one of: the uplink transmission is associated with a cell configured for layer 1 or layer 2 triggered mobility, or the uplink transmission is not associated with a serving cell; and performing the uplink transmission based on the determined power allocation priority for the uplink transmission, wherein the uplink transmission comprises at least one of a physical random access channel transmission or a sounding reference signal transmission.

Example 74. A non-transitory program storage device readable by a machine, tangibly embodying a program of instructions executable by the machine for performing operations, the operations including: determining a power allocation priority for at least one of a physical random access channel transmission or a sounding reference signal transmission on a cell, based at least on whether at least one of: the at least one of the physical random access channel transmission or the sounding reference signal transmission is associated with the cell which is a candidate target cell configured for at least one of layer 1 or layer 2 triggered mobility, the at least one of the physical random access channel transmission or the sounding reference signal transmission is not associated with a serving cell, at least one transmission configuration indicator state associated with the cell is activated, the at least one transmission configuration indicator state associated with the cell is indicated, downlink synchronization for the cell is acquired, downlink synchronization for the cell is maintained, or downlink synchronization is configured to be acquired for the cell; and performing the at least one of the physical random access channel transmission or the sounding reference signal transmission based on the determined power allocation priority.

Example 75. A non-transitory program storage device readable by a machine, tangibly embodying a program of instructions executable by the machine for performing operations, the operations including: serving at least one of a source cell or a candidate cell configured for layer 1 or layer 2 triggered mobility; and transmitting, to a user equipment, a physical downlink control channel message to trigger an uplink physical random access channel transmission for the candidate cell configured for layer 1 or layer 2 triggered mobility, wherein the uplink physical random access channel transmission is based on at least one power allocation prioritization rule.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

3GPP third generation partnership project
   4G fourth generation
   5G fifth generation
   5GC 5G core network
   ACK acknowledgement
   AMF access and mobility management function
   ASIC application-specific integrated circuit
   CC component carrier
   CD compact/computer disc
   CE control element
   CMAX maximum value for a channel
   CP control plane (e.g. CU-CP)
   CPU central processing unit
   CSI channel state information
   CU central unit or centralized unit
   DCI downlink control information
   DL downlink
   DSP digital signal processor
   DU distributed unit
   DVD digital versatile disc
   eNB evolved Node B (e.g., an LTE base station)
   EN-DC E-UTRAN new radio-dual connectivity
   en-gNB node providing NR user plane and control plane protocol terminations towards the UE, and acting as a secondary node in EN-DC
   E-UTRA evolved universal terrestrial radio access, i.e., the LTE radio access technology
   E-UTRAN E-UTRA network
   F1 interface between the CU and the DU
   FFS for further study
   FPGA field-programmable gate array
   FR frequency range (e.g. FR1, FR2)
   gNB base station for 5G/NR, i.e., a node providing NR user plane and control plane protocol terminations towards the UE, and connected via the NG interface to the 5GC
   HARQ hybrid automatic repeat request
   HO handover
   IAB integrated access and backhaul
   I/F interface
   I/O input/output
   L1 layer 1
   L2 layer 2
   L3 layer 3
   LMF location management function
   LTE long term evolution (4G)
   LTM L1/L2 triggered mobility
   LRR link recovery request
   MAC medium access control
   MCG master or main cell group
   MME mobility management entity
   MRO mobility robustness optimization
   Mux multiplexer
   NCE network control element
   ng or NG new generation
   ng-eNB new generation eNB
   NG-RAN new generation radio access network
   NR new radio
   N/W network
   OPT option
   PCell primary cell
   PDA personal digital assistant
   PDCCH physical downlink control channel
   PDCP packet data convergence protocol
   PHY physical layer
   PRACH physical random access channel
   PUCCH physical uplink control channel
   PUSCH physical uplink shared channel
   RA random access
   RACH random access channel
   RAM random access memory
   RAN radio access network
   RAN1 radio layer 1
   RAN1 #RAN meeting
   RAR random access response
   Rel release
   RLC radio link control
   ROM read-only memory RRC radio resource control
RS reference signal
RU radio unit
Rx receiver or reception
SCell secondary cell
SCG secondary cell group
SDAP service data adaptation protocol
SGW serving gateway
SMF session management function
SON self-organizing/optimizing network
SR scheduling request
SRS sounding reference signal
TA timing advance
TCI transmission configuration indicator or indication
TRP transmission reception point
TS technical specification
Tx transmitter or transmission
Type-2 2 step RACH procedure
UAV unmanned aerial vehicle
UCI uplink control information
UE user equipment (e.g., a wireless, typically mobile device)
UI user interface
UL uplink
UPF user plane function
USB universal serial bus
X2 network interface between RAN nodes and between RAN and the core network
Xn network interface between NG-RAN nodes

What is claimed is:

1. An apparatus comprising:
   at least one processor; and
   at least one memory storing instructions that, when executed by the at least one processor, cause the apparatus at least to perform:
   determining a power allocation priority for an uplink transmission, based at least on determining that the uplink transmission is associated with a candidate cell configured for layer 1 or layer 2 triggered mobility, wherein the determining the power allocation priority comprises determining the power allocation priority for the uplink transmission on the candidate cell for layer 1 or layer 2 triggered mobility to be higher than a power allocation priority for a physical random access channel transmission on a primary cell; and
   performing the uplink transmission based on the determined power allocation priority for the uplink transmission, wherein the uplink transmission comprises a physical random access channel transmission.

2. The apparatus of claim 1, wherein the determining the power allocation priority comprises
   determining the power allocation priority for the uplink transmission on the candidate cell for layer 1 or layer 2 triggered mobility, based at least on whether at least one of: at least one transmission configuration indicator state is activated, the at least one transmission configuration indicator state is indicated, downlink synchronization is acquired, the downlink synchronization is maintained, or the downlink synchronization is configured to be acquired for the candidate target cell.

3. The apparatus of claim 1, wherein the determining the power allocation priority comprises:
   determining the power allocation priority for the uplink transmission to be higher than a power allocation priority for at least one of:
   a physical uplink shared channel transmission,
   a physical uplink control channel transmission,
   a sounding reference signal transmission on a serving cell other than a primary cell, or
   a physical random access channel transmission on a serving cell other than a primary cell.

4. The apparatus of claim 1, wherein the determining the power allocation priority further comprises:
   determining the power allocation priority for the uplink transmission on the candidate cell for layer 1 or layer 2 triggered mobility to be higher than a power allocation priority for at least one of: a physical uplink shared channel transmission or a physical uplink control channel transmission.

5. The apparatus of claim 1, wherein the determining the power allocation priority comprises:
   determining the power allocation priority for the uplink transmission on a candidate cell for layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

6. The apparatus of claim 1, wherein the determining the power allocation priority comprises:
   determining the power allocation priority for the uplink transmission on a candidate cell for layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

7. The apparatus of claim 1, wherein the determining the power allocation priority comprises:
   determining at least partly the power allocation priority for the uplink transmission based on whether the uplink transmission is associated with a cell for which a timing acquisition is to be acquired.

8. The apparatus of claim 1, wherein the candidate cell configured for layer 1 or layer 2 triggered mobility comprises a candidate target cell configured for layer 1 or layer 2 triggered mobility.

9. The apparatus of claim 1, wherein the apparatus comprises a user equipment.

10. The apparatus of claim 1, wherein performing the uplink transmission comprises performing the uplink transmission on the candidate cell based on the determined power allocation priority for the uplink transmission.

11. A method comprising:
    determining a power allocation priority for an uplink transmission, based at least on determining that the uplink transmission is associated with a candidate cell configured for layer 1 or layer 2 triggered mobility, wherein the determining the power allocation priority comprises determining the power allocation priority for the uplink transmission on the candidate cell for layer 1 or layer 2 triggered mobility to be higher than a power allocation priority for a physical random access channel transmission on a primary cell; and
    performing the uplink transmission based on the determined power allocation priority for the uplink transmission, wherein the uplink transmission comprises a physical random access channel transmission.

12. The method of claim 11, wherein the determining the power allocation priority comprises:
- determining the power allocation priority for the uplink transmission to be higher than a power allocation priority for at least one of:
- a physical uplink shared channel transmission,
- a physical uplink control channel transmission,
- a sounding reference signal transmission on a serving cell other than a primary cell, or
- a physical random access channel transmission on a serving cell other than a primary cell.

13. The method of claim 11, wherein the determining the power allocation priority further comprises:
- determining the power allocation priority for the uplink transmission on the candidate cell for layer 1 or layer 2 triggered mobility to be higher a power allocation priority for at least one of a physical uplink shared channel transmission or a physical uplink control channel transmission.

14. The method of claim 11, wherein the determining the power allocation priority comprises:
- determining the power allocation priority for the uplink transmission on the candidate cell for layer 1 or layer 2 triggered mobility, based at least on whether at least one of: at least one transmission configuration indicator state is activated, the at least one transmission configuration indicator state is indicated, downlink synchronization is acquired, the downlink synchronization is maintained, or the downlink synchronization is configured to be acquired for the candidate cell.

15. The method of claim 11, wherein the determining the power allocation priority comprises:
- determining the power allocation priority for the uplink transmission on a candidate cell for layer 1 or layer 2 triggered mobility without at least one of an activated transmission configuration indicator state or an indicated transmission configuration indicator state to be lower than a power allocation priority for at least one of a physical random access channel transmission on a primary cell, a physical uplink shared channel transmission, or a physical uplink control channel transmission.

16. The method of claim 11, wherein the determining the power allocation priority comprises:
- determining the power allocation priority for the uplink transmission on a candidate cell for layer 1 or layer 2 triggered mobility without at least one of an activated transmission configuration indicator state or an indicated transmission configuration indicator state to be the same as a power allocation priority for at least one of a sounding reference signal transmission or a physical random access channel transmission on a serving cell other than a primary cell.

17. The method of claim 11, wherein the determining the power allocation priority comprises:
- determining at least partly the power allocation priority for the uplink transmission based on whether the uplink transmission is associated with a cell for which a timing acquisition is to be acquired.

18. The method of claim 11, wherein the candidate cell configured for layer 1 or layer 2 triggered mobility comprises a candidate target cell configured for layer 1 or layer 2 triggered mobility.

19. The method of claim 11, wherein the method is performed by a user equipment.

20. A non-transitory program storage device readable by a machine, tangibly embodying a program of instructions executable by the machine for performing operations, the operations including:
- determining a power allocation priority for an uplink transmission, based at least on determining that the uplink transmission is associated with a candidate cell configured for layer 1 or layer 2 triggered mobility, wherein the determining the power allocation priority comprises determining the power allocation priority for the uplink transmission on the candidate cell for layer 1 or layer 2 triggered mobility to be higher than a power allocation priority for a physical random access channel transmission on a primary cell; and
- performing the uplink transmission based on the determined power allocation priority for the uplink transmission, wherein the uplink transmission comprises a physical random access channel transmission.

* * * * *

UNITED STATES PATENT AND TRADEMARK OFFICE
CERTIFICATE OF CORRECTION

PATENT NO. : 12,324,024 B2
APPLICATION NO. : 18/925156
DATED : June 3, 2025
INVENTOR(S) : Keeth Saliya Jayasinghe Laddu, Timo Koskela and Sanjay Goyal Page 1 of 1

It is certified that error appears in the above-identified patent and that said Letters Patent is hereby corrected as shown below:

In the Claims

Claim 2, Column 27, Line 60, delete "target"

Claim 13, Column 29, Line 16, after "higher" insert --than--

Signed and Sealed this
Twenty-fifth Day of November, 2025

John A. Squires
*Director of the United States Patent and Trademark Office*